United States Patent
Alam et al.

(10) Patent No.: US 11,006,310 B2
(45) Date of Patent: May 11, 2021

(54) NODE-DENSITY AWARE INTEREST PACKET FORWARDING IN AD HOC NETWORK

(71) Applicant: Intel Corporation, Santa Clara, CA (US)

(72) Inventors: S. M. Iftekharul Alam, Hillsboro, OR (US); Maria Ramirez Loaiza, Beaverton, OR (US); Gabriel Arrobo Vidal, Hillsboro, OR (US); Satish Chandra Jha, Hillsboro, OR (US); Ravikumar Balakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/456,913

(22) Filed: Jun. 28, 2019

(65) Prior Publication Data

US 2019/0320340 A1 Oct. 17, 2019

(51) Int. Cl.
*H04W 28/02* (2009.01)
*H04W 80/12* (2009.01)
*H04W 84/18* (2009.01)

(52) U.S. Cl.
CPC ... *H04W 28/0226* (2013.01); *H04W 28/0284* (2013.01); *H04W 80/12* (2013.01); *H04W 84/18* (2013.01)

(58) Field of Classification Search
CPC ........... H04W 28/021; H04W 28/0226; H04W 28/0284; H04W 80/12; H04W 84/18; H04L 45/16
See application file for complete search history.

(56) References Cited

U.S. PATENT DOCUMENTS

| | | | | |
|---|---|---|---|---|
| 8,233,389 B2* | 7/2012 | Yim | ................. | H04L 47/14 370/229 |
| 2008/0247408 A1* | 10/2008 | Yoon | ................. | H04W 40/26 370/408 |
| 2020/0022159 A1* | 1/2020 | Bai | ................. | H04W 4/46 |

OTHER PUBLICATIONS

Grassi, G, "Vanet via named data networking", IEEE INFOCOMM 2014 NOM Workshop, 2014., (2014), 6 pgs.
Grassi, G, "Navigo: Interest Forwarding by Geolocations in Vehicular Named Data Networking", IEEE WoWMoM,, (2015), 9 pgs.
Khomani, G, "An Adaptive Node Density Estimation in VANETs Using Received Signal Power", 2015 21st Asia-Pacific Conference on Communications (APCC)Kyoto doi: 10.1109 APCC.2015. 7412570, (2015), 544-549.

* cited by examiner

*Primary Examiner* — Kan Yuen
(74) *Attorney, Agent, or Firm* — Schwegman Lundberg & Woessner, P.A.

(57) ABSTRACT

Systems and techniques for node-density aware interest packet forwarding in a dynamic ad hoc information centric network (ICN) are described herein. For example, a next interest packet to forward may be obtained at a network node. A time period to hold the next interest packet before forwarding may be calculated based on node density in the network. The node may then broadcast the next interest packet upon expiration of a timer set to the time period and started when the next interest packet was obtained.

24 Claims, 5 Drawing Sheets

NODE-DENSITY AWARE INTEREST PACKET FORWARDING IN AD HOC NETWORK

TECHNICAL FIELD

Embodiments described herein generally relate to computer networking and more specifically to node-density aware interest packet forwarding in a dynamic ad hoc information centric network (ICN).

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
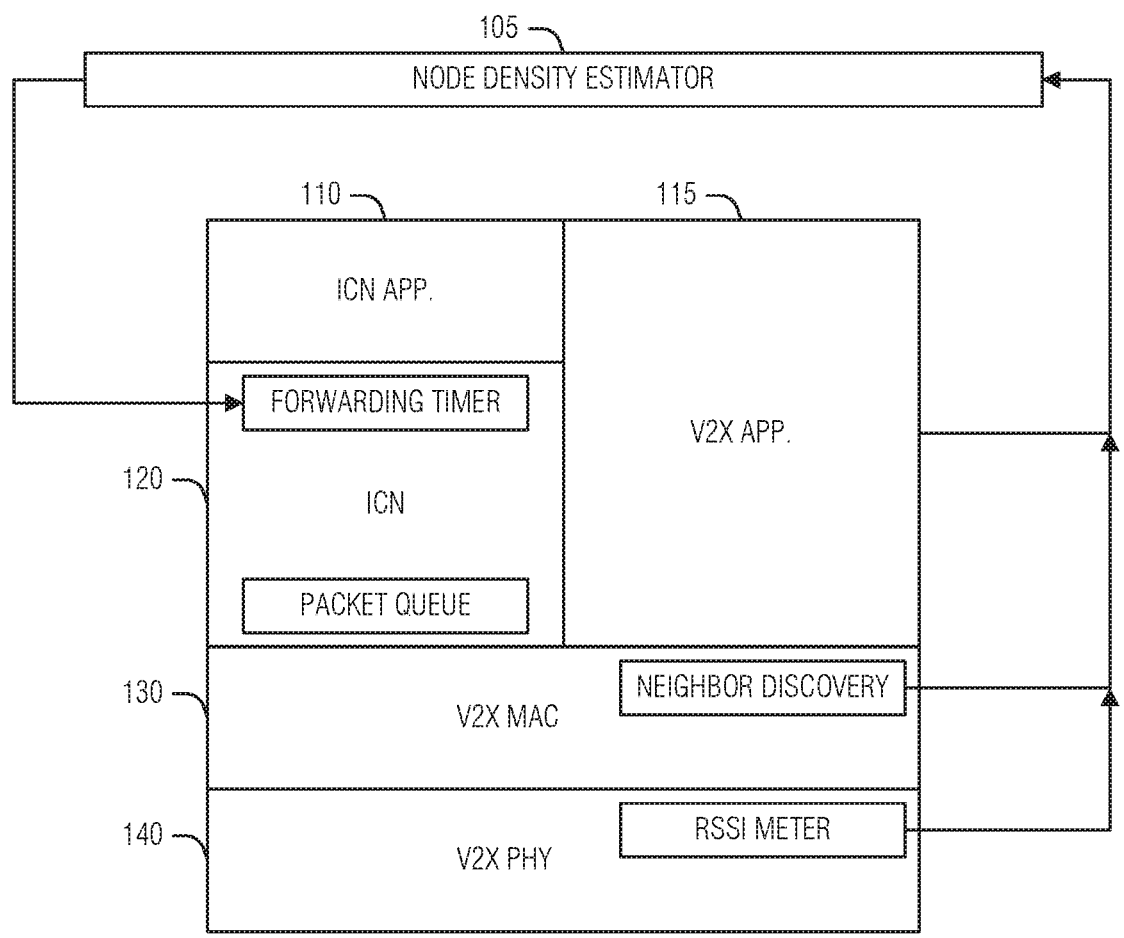
FIG. 1 illustrates an example of an ICN network stack, according to an embodiment.

Some operating scenarios generally use radio broadcasts as the physical layer of an ICN, such as vehicular networks (e.g., ad hoc vehicle to vehicle (V2V), vehicle to roadside unit, etc.). As used herein, an ad hoc network does not rely on a pre-existing infrastructure, but rather is composed of various units that may change over time. Forwarding interest packets via radio broadcast in a decentralized dynamic network, such as an ad hoc vehicle network, may incur significant overhead. Due to the shared nature of the wireless medium, multiple nodes may receive the interest packet and forward it by re-broadcasting it on the wireless medium. Thus, these forwarding nodes may start competing, causing broadcast storm in the network.

A distributed timer-based forwarder select technique may be used to address broadcast. Here, each node calculates a timer value in a distributed fashion based on the node's geo-location and communication capability. A neighbor node (e.g., a node within broadcast range or within a defined spatial locality) with the smallest timer value generally is elected as the next hop forwarder and re-broadcasts the interest packet. Upon reception of the broadcast from the elected node, other neighboring nodes suppress their interest forwarding transmission to avoid a broadcast storm. The timer calculation mechanism, however, does not take node density—or traffic density in vehicular network—into consideration.

For example, in a sparse network (e.g., few vehicles on a section of road), a timer for a node (e.g., vehicle) with weak a communication link may have a higher value, even though that node might be the only option to propagate an interest packet because the other neighbors can't reach a portion of the nodes. Hence, here, end-to-end latency may be increased if the timer is not adjusted according to node density. In a dense network, the timer may be coordinated with an application layer interest packet generation rate. Without this coordination, a new interest packet may collide with the ongoing propagation of the previous interest packet in the broadcast medium. Again, node density consideration may be important for faster and reliable interest packet forwarding. These issues may be exacerbated in time or safety critical applications.

To address some of the issues noted above, a unified interest packet forwarding timer to control the flow of interest packets from the application layer as well as interest packets forwarded from other neighboring nodes is described below. A packet queue within the ICN layer may be used to store interest packets if they are received while another interest packet is being served by the timer. Node density is considered when calculating timer values. For example, weights may be assigned to the timer function based on node density. These techniques may decrease latency in networks with variable broadcast sparsity, benefiting many scenarios with time or safety critical communications. Additional details and examples are described below.

FIG. 1 illustrates an example of an ICN network stack, according to an embodiment. As illustrated, a packet queue and a node-density aware timer calculator are integrated into the ICN layer 120 of the networking protocol stack. The packet queue is configured to store incoming interest packets from both the application layer 110 and neighboring nodes. In an example, the transfer of interest packet from the packet queue to the ICN forwarding daemon is controlled by a single timer. This timer indirectly regulates the application layer interest packet rate and adjusts its timer value based on node density.

In an example, the forwarding timer calculates its value from the node density based on the following:

$$timer_{forwarding}(u) = density_{factor}\left(w_1 f(geoLoc(u)) + w_2 \sum_{v \in Neirhbors(u)} link_{capacity}(u, v)\right)$$

where, u is the node, $density_{factor}$ is a fraction between 0 and 1 indicating the level of node density, W1 and W2 are two weight factors respectively applied to adjust the relative impacts of the location of u and the communication link capacity of u with neighboring nodes.

In an example, a node density estimator 105 that interacts with various layers of the stack is configured to collect node density information. As illustrated, the node density estimator 105 receives density information from a vehicle to a vehicle-to-everything (V2X) protocol stack. For example, a V2X application 115 broadcasting a periodic beacon or basic safety message may contain the location or the speed of a vehicle. The node density estimator 105 is configured to estimate near real-time node density with the availability of such information. A neighbor discovery protocol of a V2X MAC layer 130, for example, may provide similar information. For example, node density may be estimated based on received signal strength information from the physical layer 140.

The presence of additional information, such as that provided by the MAC 130 or PRY 140 layers may provide more accurate results, however, not all components are needed in all implementations. Thus, for example a first node may incorporate only that node density information received from the application layer 110 or 115, while another node may incorporate only the PHY layer 140 information to calculate node density. In an example, the forwarding timer calculator within the ICN layer 120 interacts with the node density estimator 105 each time the forwarding timer re-calculates the timer value.

Figure 2:
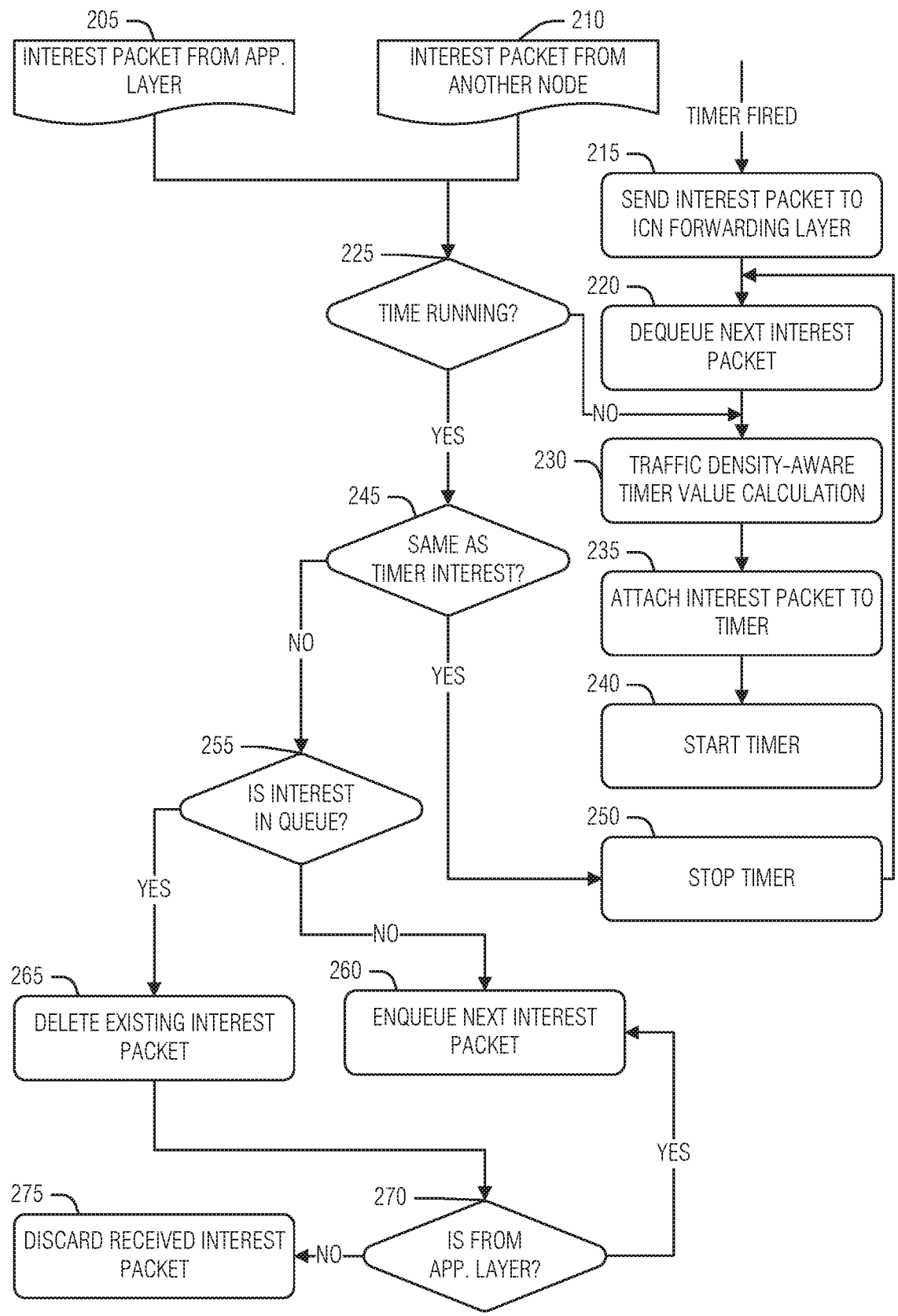
FIG. 2 is an example of a traffic-density aware interest packet forwarding flow, according to an embodiment.

FIG. 2 is an example of a traffic-density aware interest packet forwarding flow, according to an embodiment.

Upon reception of an interest packet, such as from the application layer 205 or another node 210, the node checks whether there is a timer running for an already scheduled interest packet (decision 225). If there is no timer running, it will get real-time node-density estimation information from node density estimator circuitry and calculates a timer value (operation 230). The node may then attach the received interest packet to the timer (operation 235) before starting the timer (operation 240). The attachment ensures that the proper interest packet is forwarded (operation 215) and dequeued (operation 220) upon expiration of the timer.

When there is an existing tinier running (decision 225), the node may check whether the name of the received interest packet matches the name of the interest packet currently attached to running timer (decision 245). If there is a match found (decision 245), the timer may be stopped (operation 250) and a new interest packet will be popped from the packet queue (operation 220), the timer value will be calculated (operation 230) for the newly popped interest (operation 235), and the timer is started (operation 240) as noted above. If there is no match found and the node does not find similar interest packets in the packet queue (decision 255), the received interest packet will be pushed to packet queue (operation 260).

However, if there are similar interest packet found in the queue (decision 255), the node removes that packet from the queue (operation 265). The node may then take one or more of the following actions depending on the source of the interest packet. First, the node may enqueue the new interest packet if it comes from the application layer (decision 270). This action may be made under the assumption that the application layer retransmitted the same interest packet. Second, the node may discard the packet (operation 275) if it comes from a neighboring node (decision 270). Here, the node may assume that the interest packet waiting in the queue has already been served by a neighboring node.

As noted above, if the timer fires (e.g., expires), the interest packet attached to the timer is sent to the ICN forwarding daemon—which manages the PIT entry—that then forwards the interest packet via radio broadcast (operation 215). Then a new interest packet is popped from the packet queue (operation 220) and the flow continues as noted above.

Figure 3:
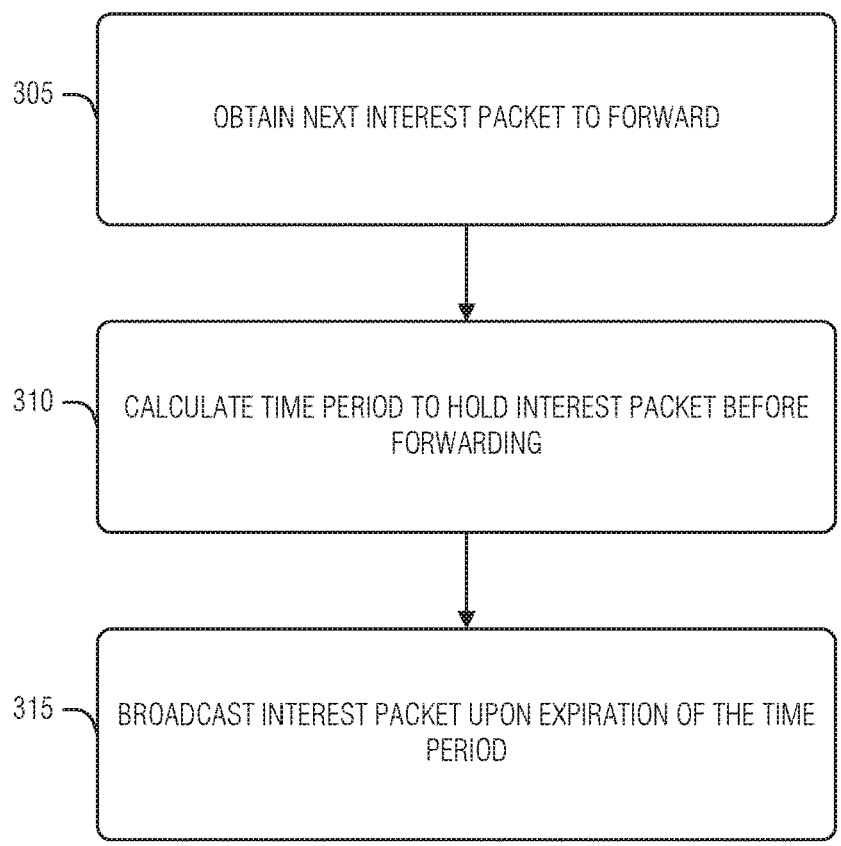
FIG. 3 is an example of a method for node-density aware interest packet forwarding in an ad hoc ICN, according to an embodiment.

FIG. 3 is an example of a method 300 for node-density aware interest packet forwarding in an ad hoc ICN, according to an embodiment. The operations of the method 300 are implemented in computing hardware, such as that described in FIG. 4 or 5 (e.g., processing circuitry).

At operation 305, a next interest packet to forward is obtained. Here, obtaining the next interest packet may include receiving the interest packet from an application on a node or from another node. In an example, the interest packets that are created or arrive at the node are stored in a queue. In an example, to obtain the next interest packet, the next interest packet is at the top of the queue and it is dequeued.

In an example, the node ascertains whether an interest is unique in the queue prior to enquiring the interest. In an example, uniqueness is measured by the interest packet's name. Thus, in an example, if the queue already includes an interest with the same name as a newly created or arrived interest, the node may either discard the queued interest in favor of the newer interest, or the node may discard the newer interest in favor of the queued interest.

At operation 310, the node calculates a time period to hold the next interest packet before forwarding. Thus, the interest will not be transmitted until the time period elapses. Here, the time period is based on node density in the network. Thus, compared to traditional timing-based techniques, the denser the network, the longer the time period, and the more sparse the network, the shorter the time period. This enables sparse networks to communicate more effectively by not imposing excessive timer periods for nodes based on poor network links when there may not be better links among other nodes. Similarly, by lengthening the time period in dense networks, the chance that multiple nodes will attempt a simultaneous broadcast is reduced, which in turn, reduces the probability of collisions in wireless network.

In an example, the timer period is further based on link capacity of the node to other nodes in the network. Here, link capacity may be measured in several ways. For example, the node may count how many other nodes to which it has a good link. The node may average available bandwidth to a population of other nodes. Other measurements that establish a basis indicating the node's position in the ad hoc network (e.g., in relation to other nodes) may also be used.

In an example, the time period combines the link capacity with the node density. Here, as noted above, values derived from these elements may be added together. In an example, a weight may be applied to each in order to adjust the relative impact of each element on the timer period.

In an example, calculating the time period includes obtaining node density information. Node density may come from several sources, such as MAC, PHY, or application layer processes. Thus, in an example, the node density information is obtained from an application aware of other nodes. This may be prevalent in scenarios where the higher layer application is used to participate in the ad hoc network, such as in V2V networks. In the scenarios, the V2V application may receive updates indicating how many nodes are participating in the network, the geographic spread of these nodes, etc.

In an example, the node density information is obtained from a media access (MAC) layer of the node. Some network discovery mechanisms that operate on the MAC layer may be used in this scenario. Here, as opposed to the possibly detailed information about the network, the MAC discovery techniques are likely to illustrate how connected the node is. Thus, if the node discovers many other nodes, then the node may conclude that the network is locally dense, if it the entirety of the network is sparse.

In an example, the node density information is obtained from a physical layer (PHY) of the node. Like the MAC discovery, the PHY layer may determine connection characteristics to immediately (e.g., zero hops) reachable nodes. Not only may the node count how many other nodes are reachable, but the node may also evaluate the connection strength. These factors establish density within the context of determining how to set the time period to avoid undue delay (e.g., latency) in sparse networks and avoid flooding in dense networks.

In an example, the node density is a density factor based on the geographic location of the node. Thus, the position of the node may be used to establish how dense the network is with respect to the node. Such information may be obtained, for example, from a higher-level application that is more actively participating in the ad hoc process that established the network. For example, a V2X application that maintains locations of network nodes. Here, the node's location may establish that the node is on the edge of the network, where node density is lower. In an example, the density factor is between zero and one.

At operation 315, the next interest packet is broadcast upon expiration of a timer set to the time period. Generally, the timer is started when the time period is calculated, which is essentially when the next interest packet was obtained (e.g., dequeued). In an example, the node refrains from broadcasting any interest packet while the timer is active. In an example, a transceiver is used to broadcast the interest packet via a wireless medium.

Figure 4:
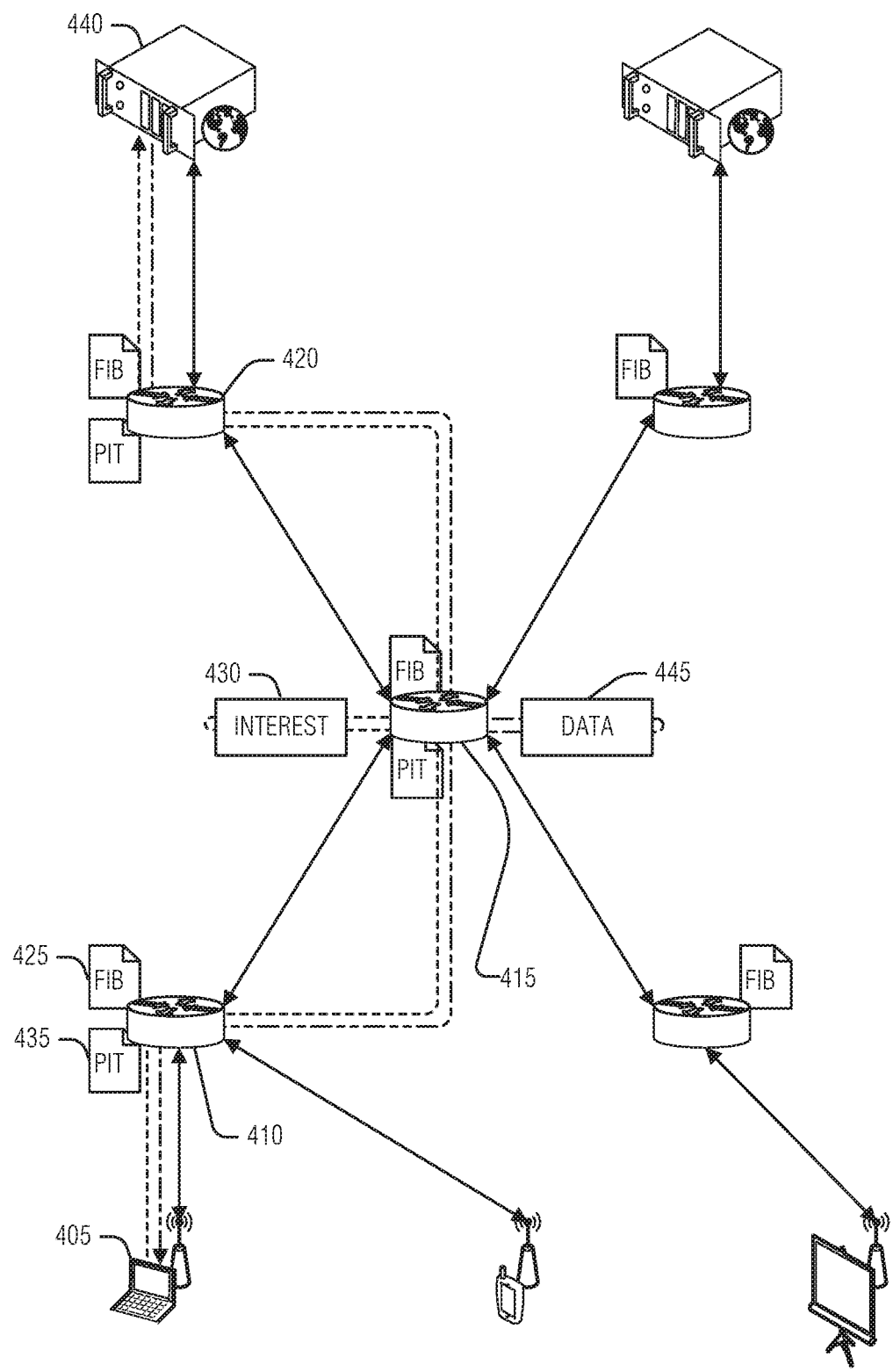
FIG. 4 illustrates an example ICN, according to an embodiment.
Figure 5:
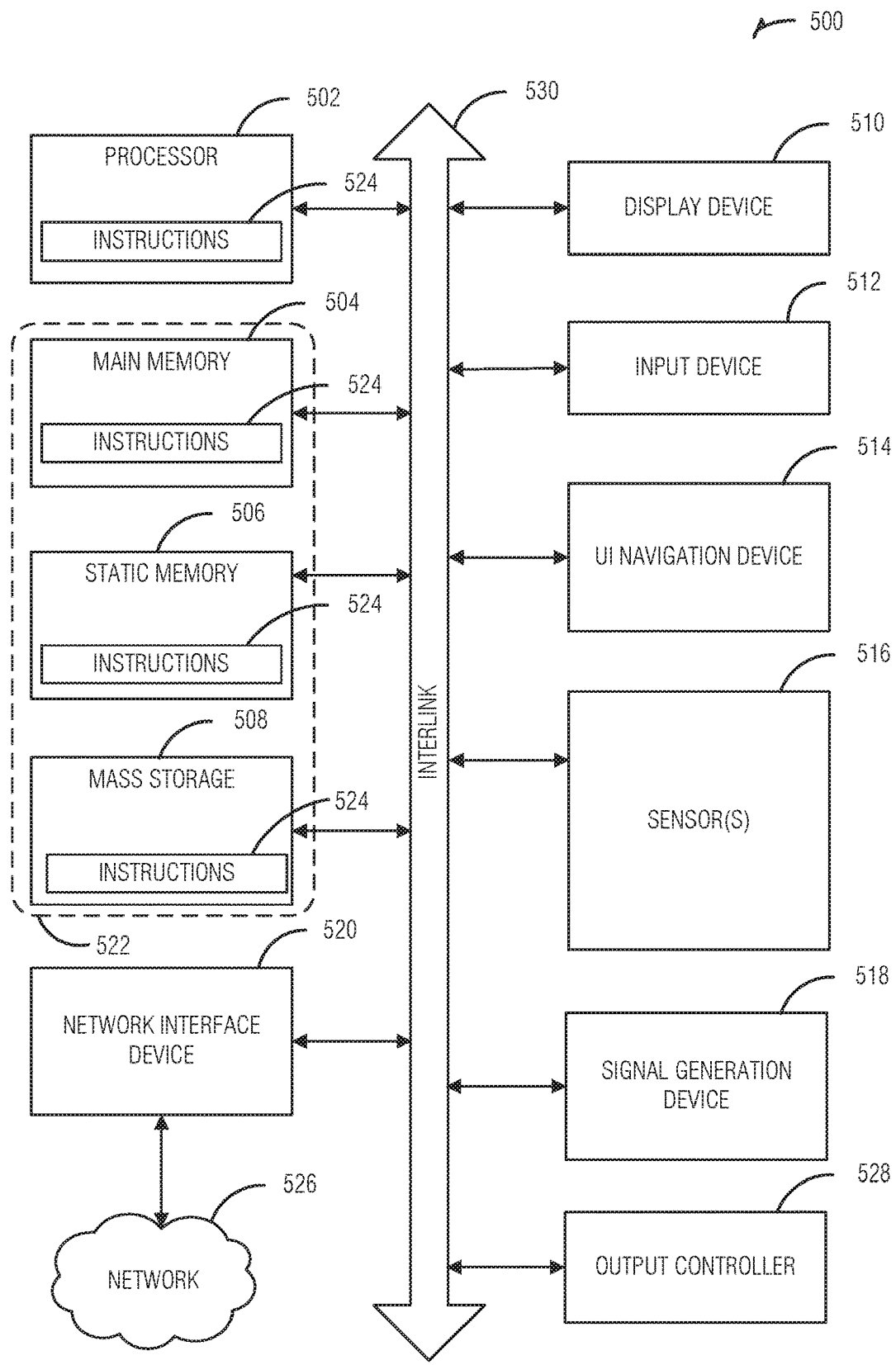
FIG. 5 is a block diagram illustrating an example of a machine upon which one or more embodiments may be implemented.

FIGS. 4 and 5 below provide additional details of the components in FIG. 1. For example, FIG. 4 illustrates several details and variations in ICNs. FIG. 5 illustrates several examples of computer hardware that can be used to implement any of the components illustrated in FIG. 1.

FIG. 4 illustrates an example ICN, according to an embodiment ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 405 (e.g., subscriber) requests named content from the network itself. The content request may be called an interest and transmitted via an interest packet 430. As the interest packet traverses network devices (e.g., network elements, routers, switches, hubs, etc.) such as network elements 410, 415, and 420 a record of the interest is kept, for example, in a pending interest table (PIT) at each network element. Thus, network element 410 maintains an entry in its PIT 435 for the interest packet 430, network element 415 maintains the entry in its PIT, and network element 420 maintains the entry in its PIT.

When a device, such as publisher 440, that has content matching the name in the interest packet 430 is encountered, that device 440 may send a data packet 445 in response to the interest packet 430. Typically, the data packet 445 is tracked back through the network to the source (e.g., device 405) by following the traces of the interest packet 430 left in the network element PITs. Thus, the PIT 435 at each network element establishes a trail back to the subscriber 405 for the data packet 445 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 430 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 430 specifying "www.somedomain.com or videos or v8675309." in an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 430 to data cached in the ICN element. Thus, for example, if the data 445 named in the interest 430 is cached in network element 415, then the network element 415 will return the data 445 to the subscriber 405 via the network element 410. However, if the data 445 is not cached at network element 415, the network element 415 routes the interest 430 on (e.g., to network element 420). To facilitate routing, the network elements may use a forwarding information base 425 (FIB) to match named data to an interface (e.g., physical port) for the route. Thus, the FIB 425 operates much like a routing table on a traditional network device.

In an example, additional meta-data may be attached to the interest packet 430, the cached data, or the route (e.g., in the FIB 425), to provide an additional level of matching. For example, the data name may be specified as "www.somedomain.com or videos or v8675309," but also include a version number—or timestamp, time range, endorsement, etc. in this example, the interest packet 430 may specify the desired name, the version number, or the version range. The matching may then locate routes or cached data matching the name and perform the additional comparison of meta-data or the like to arrive at an ultimate decision as to whether data or a route matches the interest packet 430 for respectively responding to the interest packet 430 with the data packet 445 or forwarding the interest packet 430.

ICN has advantages over host-based networking because the data segments are individually named. This enables aggressive caching throughout the network as a network element may provide a data packet 430 in response to an interest 430 as easily as an original author 440. Accordingly, it is less likely that the same segment of the network will transmit duplicates of the same data requested by different devices.

Fine grained encryption is another feature of many ICN networks. A typical data packet 445 includes a name for the data that matches the name in the interest packet 430. Further, the data packet 445 includes the requested data and may include additional information to filter similarly named data (e.g., by creation time, expiration time, version, etc.). To address malicious entities providing false information under the same name, the data packet 445 may also encrypt its contents with a publisher key or provide a cryptographic hash of the data and the name. Thus, knowing the key (e.g., from a certificate of an expected publisher 440) enables the recipient to ascertain whether the data is from that publisher 440. This technique also facilitates the aggressive caching of the data packets 445 throughout the network because each data packet 445 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc. Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (SIB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless infrared (IR), near field communication (NFC), etc. connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

ADDITIONAL NOTES & EXAMPLES

Example 1 is a device for node-density aware interest packet forwarding in a dynamic ad hoc information centric network (ICN), the device included in a node in a network and comprising: processing circuitry; and a memory including instructions that, when the device is in operation, configure the processing circuitry to: obtain a next interest packet to forward; calculate a time period to hold the next interest packet before forwarding, the time period based on node density in the network; and broadcast the next interest packet upon expiration of a timer set to the time period and started when the next interest packet was obtained.

In Example 2, the subject matter of Example 1, wherein the node refrains from broadcasting any interest packet while the timer is active.

In Example 3, the subject matter of any of Examples 1-2, wherein, to broadcast the next interest packet, the processing circuitry uses a transceiver to broadcast the interest packet via a wireless medium.

In Example 4, the subject matter of any of Examples 1-3, wherein, to calculate the time period, the processing circuitry obtains node density information.

In Example 5, the subject matter of Example 4, wherein the node density information is obtained from an application aware of other nodes.

In Example 6, the subject matter of any of Examples 4-5, wherein the node density information is obtained from a media access (MAC) layer of the node.

In Example 7, the subject matter of any of Examples 4-6, wherein the node density information is obtained from a physical layer (PHY) of the node.

In Example 8, the subject matter of any of Examples 1-7, wherein the time period is further based on link capacity of the node to other nodes in the network.

In Example 9, the subject matter of Example 8, wherein the time period combines the link capacity with the node density.

In Example 10, the subject matter of Example 9, wherein the node density is a density factor based on the geographic location of the node.

In Example 11, the subject matter of Example 10, wherein the density factor is between zero and one.

In Example 12, the subject matter of any of Examples 1-11, wherein that the timer is used to coordinate forwarding interest packets from both a local application layer and neighboring nodes.

Example 13 is a method for node-density aware interest packet forwarding in a dynamic ad hoc information centric network (ICN), the method comprising: obtaining a next interest packet to forward; calculating, by a node in a network, a time period to hold the next interest packet before forwarding, the time period based on node density in the network; and broadcasting the next interest packet upon expiration of a timer set to the time period and started when the next interest packet was obtained.

In Example 14, the subject matter of Example 13, wherein the node refrains from broadcasting any interest packet while the timer is active.

In Example 15, the subject matter of any of Examples 13-14, wherein broadcasting the next interest packet includes using a transceiver to broadcast the interest packet via a wireless medium.

In Example 16, the subject matter of any of Examples 13-15, wherein calculating the time period includes obtaining node density information.

In Example 17, the subject matter of Example 16, wherein the node density information is obtained from an application aware of other nodes.

In Example 18, the subject matter of any of Examples 16-17, wherein the node density information is obtained from a media access (MAC) layer of the node.

In Example 19, the subject matter of any of Examples 16-18, wherein the node density information is obtained from a physical layer (PHY) of the node.

In Example 20, the subject matter of any of Examples 13-19, wherein the time period is further based on link capacity of the node to other nodes in the network.

In Example 21, the subject matter of Example 20, wherein the time period combines the link capacity with the node density.

In Example 22, the subject matter of Example 21, wherein the node density is a density factor based on the geographic location of the node.

In Example 23, the subject matter of Example 22, wherein the density factor is between zero and one.

In Example 24, the subject matter of any of Examples 13-23, wherein that the timer is used to coordinate forwarding interest packets from both a local application layer and neighboring nodes.

Example 25 is at least one machine-readable medium including instructions for node-density aware interest packet forwarding in a dynamic ad hoc information centric network (ICN), the instructions, when executed by processing circuitry, cause the processing circuitry to perform operations comprising: obtaining a next interest packet to forward; calculating, by a node in a network, a time period to hold the next interest packet before forwarding, the time period based on node density in the network; and broadcasting the next interest packet upon expiration of a timer set to the time period and started when the next interest packet was obtained.

In Example 26, the subject matter of Example 25, wherein the node refrains from broadcasting any interest packet while the timer is active.

In Example 27, the subject matter of any of Examples 25-26, wherein broadcasting the next interest packet includes using a transceiver to broadcast the interest packet via a wireless medium.

In Example 28, the subject matter of any of Examples 25-27, wherein calculating the time period includes obtaining node density information.

In Example 29, the subject matter of Example 28, wherein the node density information is obtained from an application aware of other nodes.

In Example 30, the subject matter of any of Examples 28-29, wherein the node density information is obtained from a media access (MAC) layer of the node.

In Example 31, the subject matter of any of Examples 28-30, wherein the node density information is obtained from a physical layer (PHY) of the node.

In Example 32, the subject matter of any of Examples 25-31, wherein the time period is further based on link capacity of the node to other nodes in the network.

In Example 33, the subject matter of Example 32, wherein the time period combines the link capacity with the node density.

In Example 34, the subject matter of Example 33, wherein the node density is a density factor based on the geographic location of the node.

In Example 35, the subject matter of Example 34, wherein the density factor is between zero and one.

In Example 36, the subject matter of any of Examples 25-35, wherein that the timer is used to coordinate forwarding interest packets from both a local application layer and neighboring nodes.

Example 37 is a system for node-density aware interest packet forwarding in a dynamic ad hoc information centric network (ICN), the system comprising: means for obtaining a next interest packet to forward; means for calculating, by a node in a network, a time period to hold the next interest packet before forwarding, the time period based on node density in the network; and means for broadcasting the next interest packet upon expiration of a timer set to the time period and started when the next interest packet was obtained.

In Example 38, the subject matter of Example 37, wherein the node refrains from broadcasting any interest packet while the timer is active.

In Example 39, the subject matter of any of Examples 37-38, wherein the means for broadcasting the next interest packet include means for using a transceiver to broadcast the interest packet via a wireless medium.

In Example 40, the subject matter of any of Examples 37-39, wherein the means for calculating the time period include means for obtaining node density information.

In Example 41, the subject matter of Example 40, wherein the node density information is obtained from an application aware of other nodes.

In Example 42, the subject matter of any of Examples 40-41, wherein the node density information is obtained from a media access (MAC) layer of the node.

In Example 43, the subject matter of any of Examples 40-42, wherein the node density information is obtained from a physical layer (PHY) of the node.

In Example 44, the subject matter of any of Examples 37-43, wherein the time period is further based on link capacity of the node to other nodes in the network.

In Example 45, the subject matter of Example 44, wherein the time period combines the link capacity with the node density.

In Example 46, the subject matter of Example 45, wherein the node density is a density factor based on the geographic location of the node.

In Example 47, the subject matter of Example 46, wherein the density factor is between zero and one.

In Example 48, the subject matter of any of Examples 37-47, wherein that the timer is used to coordinate forwarding interest packets from both a local application layer and neighboring nodes.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for node-density aware interest packet forwarding in a dynamic ad hoc information centric network (ICN), the device included in a node in a network and comprising:
   processing circuitry; and
   a memory including instructions that, when the device is in operation, configure the processing circuitry to:
      obtain a next interest packet to forward;
      calculate a time period to hold the next interest packet before forwarding, the time period based on node density in the network;
      broadcast the next interest packet upon expiration of a timer set to the time period and started when the next interest packet was obtained;
      obtain a second next interest packet to forward;
      calculate a second time period to hold the second next interest packet before forwarding, the second time period based on the node density in the network;
      receive an additional interest packet from a neighbor node before the second time period has elapsed, the additional interest packet matching the second next interest packet; and
      discard the second next interest packet without broadcasting the second next interest packet in response to receipt of the additional interest packet from the neighbor node.

2. The device of claim 1, wherein the node refrains from broadcasting any interest packet while the timer is active.

3. The device of claim 1, wherein, to calculate the time period, the processing circuitry obtains node density information.

4. The device of claim 3, wherein the node density information is obtained from an application aware of other nodes.

5. The device of claim 1, wherein the time period is further based on link capacity of the node to other nodes in the network.

6. The device of claim 5, wherein e time period is calculated from a combination of the link capacity with the node density.

7. The device of claim 6, wherein the node density is a density factor based on the geographic location of the node.

8. The device of claim 1, wherein the timer is used to coordinate forwarding interest packets from both a local application layer and neighboring nodes.

9. A method for node-density aware interest packet forwarding in a dynamic ad hoc information centric network (ICN), the method comprising:
   obtaining a next interest packet to forward;
   calculating, by a node in a network, a time period to hold the next interest packet before forwarding, the time period based on node density in the network;
   broadcasting the next interest packet upon expiration of a timer set to the time period and started when the next interest packet was obtained;
   obtaining a second next interest packet to forward;
   calculating a second time period to hold the second next interest packet before forwarding, the second time period based on the node density in the network;
   receiving an additional interest packet from a neighbor node before the second time period has elapsed, the additional interest packet matching the second next interest packet; and
   discarding the second next interest packet without broadcasting the second next interest packet in response to receipt of the additional interest packet from the neighbor node.

10. The method of claim 9, wherein the node refrains from broadcasting any interest packet while the timer is active.

11. The method of claim 9, wherein calculating the time period includes obtaining node density information.

12. The method of claim 11, wherein the node density information is obtained from an application aware of other nodes.

13. The method of claim 9, wherein the time period is further based on link capacity of the node to other nodes in the network.

14. The method of claim 13, wherein the time period is calculated from a combination of the link capacity with the node density.

15. The method of claim 14, wherein the node density is a density factor based on the geographic location of the node.

16. The method of claim 9, wherein the timer is used to coordinate forwarding interest packets from both a local application layer and neighboring nodes.

17. At least one non-transitory machine-readable medium including instructions for node-density aware interest packet forwarding in a dynamic ad hoc information centric network (ICN), the instructions, when executed by processing circuitry, cause the processing circuitry to perform operations comprising:
   obtaining a next interest packet to forward;

calculating, by a node in a network, a time period to hold the next interest packet before forwarding, the time period based on node density in the network;
broadcasting the next interest packet upon expiration of a timer set to the time period and started when the next interest packet was obtained;
obtaining a second next interest packet to forward;
calculating a second time period to hold the second next interest packet before forwarding, the second time period based on the node density in the network;
receiving an additional interest, packet from a neighbor node before the second time period has elapsed, the additional interest packet matching the second next interest packet; and
discarding the second next interest packet without broadcasting the second next interest packet in response to receipt of the additional interest packet from the neighbor node.

18. The at least one non-transitory machine-readable medium of claim 17, wherein the node refrains from broadcasting any interest packet while the timer is active.

19. The at least one non-transitory machine-readable medium of claim 17, wherein calculating the time period includes obtaining node density information.

20. The at least one non-transitory machine-readable medium of claim 19, wherein the node density information is obtained from an application aware of other nodes.

21. The at least one non-transitory machine-readable medium of claim 17, wherein the time period is further based on link capacity of the node to other nodes in the network.

22. The at least one non-transitory machine-readable medium of claim 21, wherein the time period is calculated from a combination of the link capacity with the node density.

23. The at least one non-transitory machine-readable medium of claim 22, wherein the node density is a density factor based on the geographic location of the node.

24. The at least one non-transitory machine-readable medium of claim 17, wherein the timer is used to coordinate forwarding interest packets from both a local application layer and neighboring nodes.

* * * * *

UNITED STATES PATENT AND TRADEMARK OFFICE
CERTIFICATE OF CORRECTION

PATENT NO. : 11,006,310 B2  
APPLICATION NO. : 16/456913  
DATED : May 11, 2021  
INVENTOR(S) : Alam et al.

Page 1 of 1

It is certified that error appears in the above-identified patent and that said Letters Patent is hereby corrected as shown below:

In the Claims

In Column 14, Line 12, in Claim 6, delete "e" and insert --the-- therefor

In Column 15, Line 11, in Claim 17, delete "interest," and insert --interest-- therefor Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*